Figure 1:
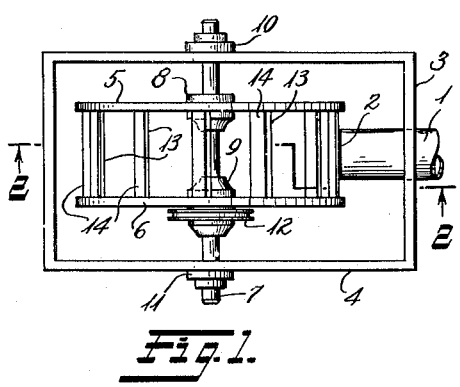

Nov. 12, 1957     E. J. RIVOCHE     2,813,030
FOOD PROCESSING APPARATUS AND METHOD
Filed Jan. 6, 1953     3 Sheets-Sheet 1

INVENTOR
Eugene J. Rivoche
BY Bacon & Thomas
ATTORNEYS

Nov. 12, 1957     E. J. RIVOCHE     2,813,030
FOOD PROCESSING APPARATUS AND METHOD
Filed Jan. 6, 1953     3 Sheets-Sheet 2
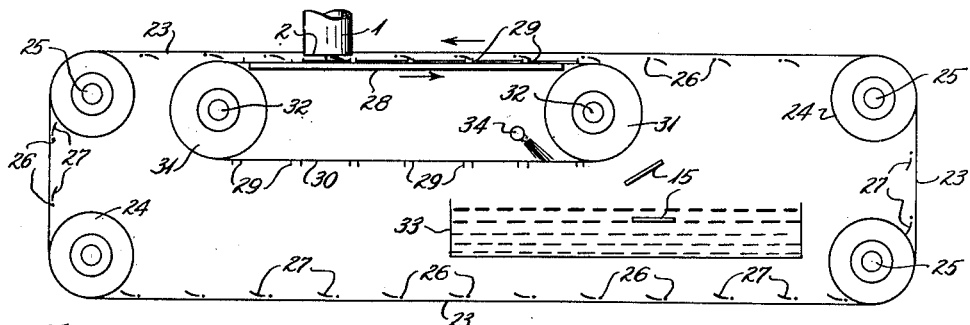
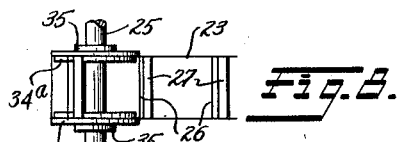
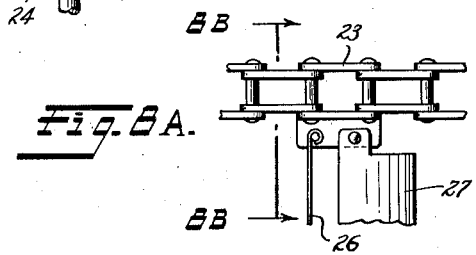
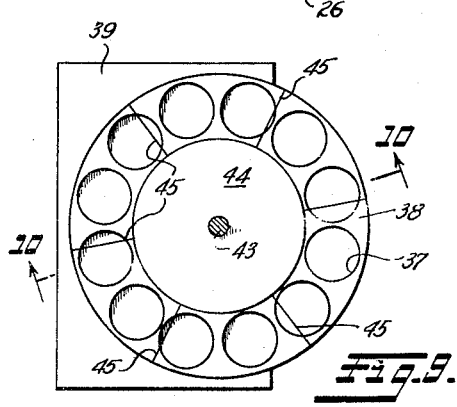
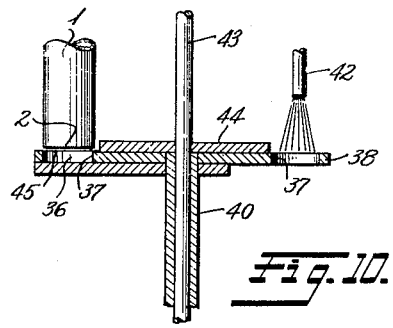
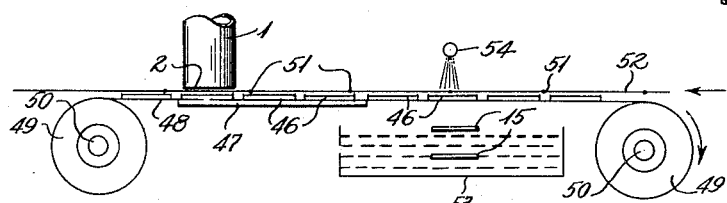
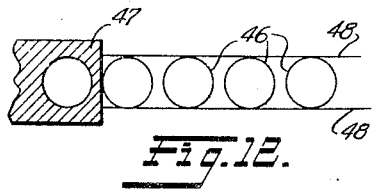
INVENTOR
*Eugene J. Rivoche*
BY *Bacon & Thomas*
ATTORNEYS

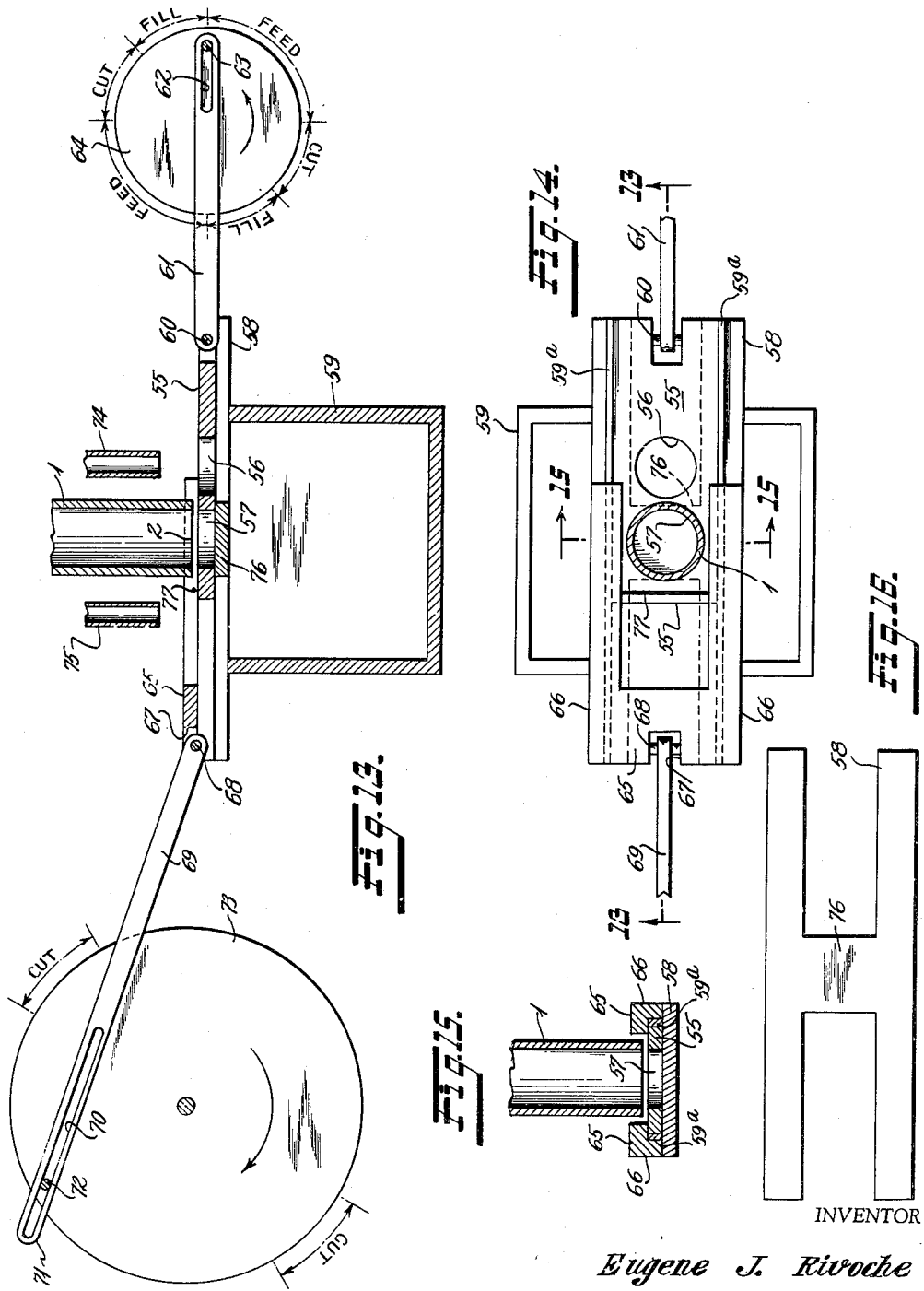

United States Patent Office 2,813,030
Patented Nov. 12, 1957

2,813,030

FOOD PROCESSING APPARATUS AND METHOD

Eugene Joel Rivoche, Washington, D. C.

Application January 6, 1953, Serial No. 329,797

19 Claims. (Cl. 99—131)

This invention relates to a novel method of processing food and to apparatus for carrying out such a process. More particularly, the invention relates to a process and apparatus for slicing gel-like materials or doughs and for continuously removing and feeding the sliced materials or doughs.

In my copending application entitled "Food Products," Serial No. 307,217, filed August 30, 1952, a novel process for producing new types of food products, and specifically new types of potato products such as potato chips, is set out. The various embodiments of that process involve the use of semi-gelled and fully gelled materials, the semi-gelled materials, as defined therein, being capable of extrusion while the fully gelled materials are not. The present invention relates to a process for slicing both the semi-gelled and the fully gelled materials, and also any similar dough-like materials.

In the slicing of doughy mixtures after extrusion, it has been the practice to utilize a thin elongated cutter such as a flat knife or a wire which passes across the extrusion orifice, thereby slicing off pieces of the material. In the processes in use heretofore, no difficulty has been experienced in separating the sliced articles from the remaining dough because the slices were usually relatively thick and fell away from the remaining dough by force of gravity. When, however, the slices are extremely thin in character, such as is the case in the preparation of potato chips, there is a strong tendency for the sliced portion to adhere to the unsliced dough after passage of the cutter therethrough so that gravity does not suffice to remove the cut particles. Since such a process of slicing must be continuous in order to be efficient and economical, and since a manual removal of the adhered slices is not economically feasible, it is necessary to provide some means for repeatedly removing the thin slices of doughy or gel-like material.

It is an object of this invention to provide a process for slicing gel-like or doughy materials and for continuously removing the sliced particles.

It is a further object of this invention to slice thin slices of gel-like or doughy materials and to provide for the continuous removal of the sliced particles, and further to provide for additional jellification of the particles simultaneously with their removal.

It is a still further object of this invention to provide apparatus for carrying out the foregoing processes.

Figure 2:
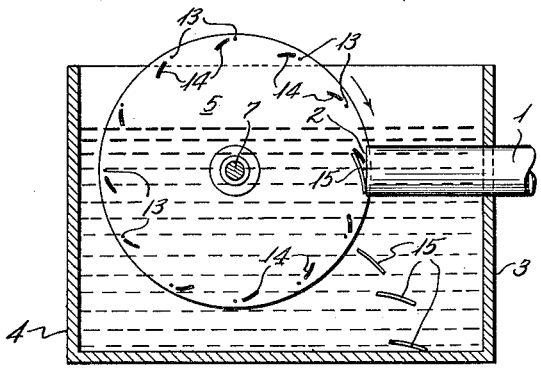
Figure 3:
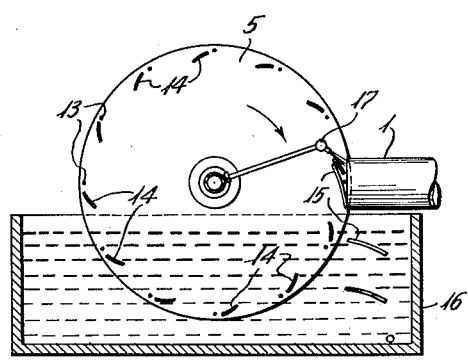
Figure 4:
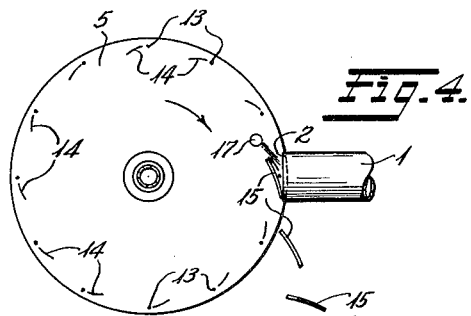
Figure 5:
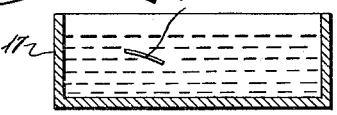
Figure 5:
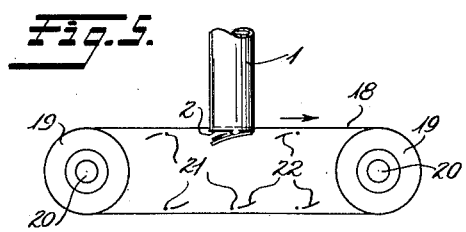
Figure 6:
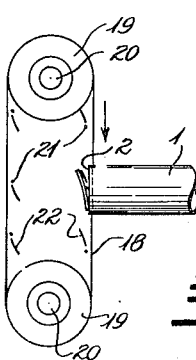
Figure 3A:
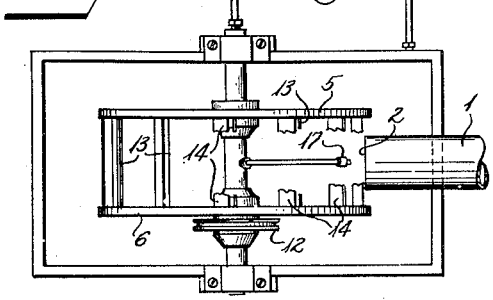

Further objects and advantages of the invention will become apparent upon reference to the following specification and drawings, wherein, Figure 1 is a plan view of one embodiment of the invention, Figure 2 is a cross-sectional view on the line 2—2 of Figure 1, Figure 3 is a cross-sectional view of a slightly modified form of the embodiment shown in Figures 1 and 2, Figure 3A is a plan view of the embodiment shown in Figure 3, Figure 4 is a cross-sectional view of another slightly modified form of the embodiment shown in Figures 1 and 2, Figure 5 is a side view of another embodiment of the invention, Figure 6 is a side view of a further embodiment of the invention, Figure 7 is a side view of a further embodiment of the invention, Figure 8 is a detailed plan view of the cutter and deflector means in Figure 7, Figure 8A is an enlarged fragmentary plan view of a portion of the cutter and deflector means shown in Figure 8, Figure 8B is a fragmentary sectional view on the line 8B—8B of Figure 8A, Figure 9 is a plan view of another embodiment of the invention, Figure 10 is a cross-sectional view taken on the line 10—10 of Figure 9, Figure 11 is a side view of still a further embodiment of the invention, Figure 12 is a detailed plan view of the feed means of Figure 11, Figure 13 is a cross-sectional view of still another embodiment of the invention, taken on the line 13—13 of Figure 14, Figure 14 is a plan view of the embodiment of the invention shown in Figure 13, Figure 15 is a partial cross-sectional view of the feed pipe and feeder mechanism of the device shown in Figure 14, taken on the line 15—15, and Figure 16 is a plan view of the feed plate of Figures 13, 14 and 15.

Referring more particularly to Figures 1 and 2, there is shown an extrusion pipe 1 having an orifice 2 and passing through a side wall 3 in a tank 4. Mounted parallel to the axis of the pipe 1 are two parallel cutter wheels 5 and 6 rotatably mounted upon a shaft 7 by means of bearings 8 and 9. The shaft 7 is in turn carried in bearings 10 and 11 mounted in the side walls of the tank 4. Adjacent the side of cutter wheel 6 is mounted a pulley 12 which is keyed or otherwise made fast to the shaft 7 and by which the cutter wheel assembly may be driven by any conventional means such as a motor and drive belt, not shown.

At equally spaced distances around the periphery of cutter wheels 5 and 6 are mounted thin wires 13 which are stretched taut between the cutter wheels 5 and 6. The wires 13 are mounted at such a radial distance from the shaft 7 as to cause them to pass across the orifice 2 of the pipe 1 when the cutter wheels 5 and 6 are rotated. Associated with each wire 13 is a deflector blade 14 having its longitudinal axis parallel to the wire 13 and having its flat surfaces tilted with respect to the wall of a cylinder which would include the wires 13.

The tank 4 may be filled with water or other suitable liquid, but is preferably filled with a calcium solution which on contacting the material emanating from the pipe 1 will bring about further jellification and cause syneresis which will facilitate the falling away of the sliced pieces 15 from the material remaining in the pipe 1. While a calcium solution has been mentioned, any solution of an edible salt of an alkaline earth metal might be used.

The operation of the embodiment of the invention shown in Figures 1 and 2 is as follows. A gel-like or doughy material is forced through extrusion pipe 1 and emanates from the orifice 2 thereof. Simultaneously with the feeding of the material through the pipe, the cutter wheel assembly is rotated so that wires 13 slice the material and deflector blades 14 deflect the sliced edge of the material away from the portion remaining in the pipe. Contact of the calcium solution with the material causes syneresis and aids in the falling away of the sliced material. While the pipe 1 has been called an extrusion pipe, it will be recognized that in the form shown in Figures 1 and 2, that is, where the area of the orifice is the same as the area of the pipe inlet, there is actually no extrusion at the orifice so that even a fully gelled material can be fed therethrough, as is more fully described in my aforementioned copending application.

In Figure 3 is illustrated another embodiment of the invention wherein the extrusion pipe 1 is located above a tank 16 similar to the tank 4 in Figures 1 and 2. In this embodiment of the invention, a nozzle or spray pipe 17 feeds a continuous spray of fluid against the cut surfaces of the material emanating from the pipe 1. The fluid sprayed through pipe 17 may be air or other suitable gas or it may be liquid from the tank 16. The liquid or gas is preferably of such a nature as to cause further gelatinization of the material emanating from the pipe. The cutters and deflector blades 13 and 14 in Figure 3 are so mounted that during the lowermost sector of their travel they pass through the liquid in tank 16, thereby delivering an additional supply of such liquid to the surface of the material being sliced to further aid in separating the slices from the material remaining in the pipe and to further aid in bringing about additional gelatinization which, in itself, aids the slicing action.

In Figure 4, there is shown still another embodiment of the invention which is similar to that shown in Figure 3 except that in Figure 4 the sliced particles 15 fall into a tank 17 which is located below the pipe orifice 2 and also below the path of travel of the wires 13 and deflector blades 14.

In Figure 5, there is shown a further embodiment of the invention which operates on the same principle as the devices of Figures 1 through 4, but which replaces the cutter wheels of such foregoing embodiments with conveyor chains. Thus, in this embodiment of the invention, an extrusion pipe 1 having an orifice 2 is mounted above a pair of chains or belts 18 passing over and driven by wheels 19 mounted on shafts 20. Between the belts 18 are mounted thin cutting means 21 which may be wires as in the foregoing embodiments. Associated with each cutting wire is a deflector blade 22 similar to those in the foregoing embodiments.

In the operation of the device shown in Figure 5, the material to be sliced is fed through the extrusion pipe 1 out of the orifice 2 into the path of movement of the wires 21 and blades 22. As the wires and blades are driven across the orifice 2, the wires slice the material emanating from the pipe while the deflector blades urge the material away from the pipe and cause the sliced portions to drop vertically into a suitable receptacle, not shown.

In Figure 6, there is shown an embodiment of the invention similar to that shown in Figure 5, but wherein the extrusion pipe 1 is horizontally located and the conveyor belts 18 are arranged vertically rather than horizontally. The operation of this embodiment of the invention is similar to that shown in Figure 5.

In Figure 7 is shown another embodiment of the invention which includes the usual extrusion pipe 1 having an orifice 2 and also includes a pair of conveyor chains or belts 23 passing over and driven by wheels 24 mounted on shafts 25. Between the belts 23 are mounted cutter knives 26 and deflector blades 27 similar to those described heretofore.

Immediately beneath the orifice 2 of the pipe 1 is mounted a feed plate 28 across the top surface of which passes a series of feeder bars 29 which are parallelly mounted between a pair of conveyor chains or belts 30 extending over and driven by wheels 31 mounted on shafts 32. The feeder bars 29 are so spaced as to provide an area therebetween sufficient to receive a slice of the material being removed from pipe 1. Beneath and to the right of the rightmost wheel 31 is mounted a tank 33 for receiving the cut particles 15. Between the upper and lower runs of the belts 30 and immediately below and to the left of the shaft 32 of the rightmost wheel 31 is located a nozzle or spray means 34 which directs a continuous flow of fluid between the belts 30 to cause the ejection of any slice of material which might stick to the belts or feeder bars.

Suitable means, not shown, is provided for continuously driving the wheels 24 so as to continuously drive the wires 26 and deflector blades 27 across the orifice 2 of the pipe 1. Any suitable conventional means is also provided for driving the wheels 31 which in turn cause the feeder bars 29 to pass across the orifice 2 to feed and remove the sliced portions of material from the pipe 1. The rotation of wheels 31 is intermittent and is correlated with the movement of the cutters 26. Thus, the drive means for wheels 31 insures that a pair of bars 29 remains under the feed pipe 1 during the time that a cutter wire is passing across the surface of the pipe, and then insures that the said bars are fed forward a step before the next cutter wire begins its cutting operation. In this manner, the cut slices 15 are stepped toward the rightmost wheel 31 and from there are dropped into the tank 33. The tank 33 contains any suitable liquid as has been mentioned in connection with the previous embodiments of this invention, and the nozzle or spray pipe 34 sprays any suitable fluid as heretofore set out. There is shown in Figure 8 a plan view of the wheels 24 which have an offset portion 34a to carry the belts 23. Each wheel 24 is fastened by any suitable means such as collars 35 and set screws, not shown, to the shaft 25.

The operation of this embodiment of the invention is as follows. As the material to be sliced is fed through pipe 1 and out of orifice 2, the wires 26 and deflector blades 27 pass across the surface of the pipe to slice and deflect downwardly the pieces of the material 15. During the slicing period, the feed bars 29 remain stationary immediately below the orifice so that the action of the deflector blades 27 causes a slice 15 to drop into the space between the feeder bars. As soon as the wire completes its cutting stroke, the feed bars 29 are moved a step to the right to place a second set of feed bars beneath the orifice 2. As soon as such second set of feed bars reaches its position under the orifice 2 and is halted in such a position, the following wire 26 commences its cutting operation and the entire procedure is repeated. As the pieces of cut material 15 are fed over the rightmost wheels 31, they fall by gravity into the tank 33. To insure that no slices stick to the belts 23 or feed bars 29, the nozzle 34 sprays fluid between the belts and removes any slices which otherwise might stick.

In Figure 10 there is shown an embodiment of the invention wherein a feed pipe 1 having an orifice 2 feeds the material to be sliced into a mold 36. The mold 36 is formed by the walls 37 of a circular aperture 41 in a plate 38 and by the upper surface of a plate 39. The plate 38 is a rotatable circular plate keyed to a hollow shaft 40 and has arranged about its periphery a series of equally spaced apertures 41 which form the side walls 37 of the molds 36. The distance between the center of each aperture and the axis of rotation of the shaft 40 is such as to cause the apertures 41 to assume a position immediately beneath the feed pipe 1. The plate 39 extends from beneath the apertures 41 which are located beneath orifice 2 to a position slightly beyond shaft 40. To the right of plate 39 and above the plate 38 in the path of movement of apertures 41 is located a fluid nozzle 42 which aids in the ejection of material from the apertures 41.

Immediately above plate 38 and keyed to a shaft 43 which passes through shaft 40 is a cutter wheel 44 which has cutting knives or wires 45 radially mounted around its periphery extending outwardly a distance sufficient to cause such knives or wires to cross the orifice 2 upon the rotation of the wheel 44. Suitable means, not shown, for rotating shafts 40 and 43 is provided.

The operation of this embodiment of the invention is as follows. Material is fed through pipe 1 out of orifice 2 into the chamber formed by the walls 37 of apertures 41 and the upper surface of the plate 39. During the filling of the chamber 36, the plate 38 remains stationary. Wheel 44 bearing the knives 45 rotates continuously, but the knives 45 are so spaced around its periphery that during the time that the chamber 36 is being filled, no knife crosses the face of the orifice 2. Immediately upon the completion of the filling of the chamber 36, a knife 45 traverses the orifice 2, thereby severing the material contained in chamber 36 from the material contained in pipe 1. As the knife completes its cutting action, the plate 38 is actuated and advances the apertures 41 one notch so that a succeeding aperture is placed under the pipe 1 and halts there. A filling of this succeeding aperture then occurs and the cutting action is repeated. As the material in the apertures 41 is fed beyond the right edge of the plate 39, the slices tend to fall through the action of gravity and any slices which stick in the apertures are removed by the action of the nozzle 42 spraying a fluid thereon.

In Figure 12, there is shown a further embodiment of the invention which is somewhat similar to that shown in Figures 9 and 10. A feed pipe 1 is adapted to feed material out of an orifice 2 into rings 46 on a plate 47. As in the previous embodiment, the inner walls of the rings 46 form with the upper surface of the plate 47 a chamber within which the material is molded. The rings 46 are carried between conveyor chains 48 which pass over and are driven by wheels 49 driven by shafts 50. Cutting wires or knives 51 are carried by belts 52 and pass across the orifice 2. The belts 52 are driven by means of any conventional means such as wheels as shown in Figures 7 and 8. Immediately to the right of the rightmost edge of plate 47 is located a tank 53 for receiving the sliced portions of material 15.

The operation of this embodiment of the invention is as follows. Material is fed from pipe 1 into the chamber formed by the rings 46 and the plate 47. As such chamber is filled, a wire or knife 51 passes between the orifice and the rings, thereby severing the material from that remaining in the pipe, and the rings are then moved forward one step so as to place another ring beneath the orifice 2. At this time, the filling operation is repeated and another wire repeats the cutting operation as the process continues. As the rings 46 pass beyond the rightmost edge of plate 27, the sliced particles 15 fall by gravity into the tank 53 and any tendency to stick is overcome by means of the nozzle 54 which directs a spray of fluid against the upper surface of the slices 15.

In Figures 13 through 16, there is shown another embodiment of the invention similar to that shown in Figures 9 and 10. An extrusion pipe 1 having an orifice 2 is mounted over a plate 55 having apertures 56 and 57 therein. The plate 55 is in turn slidably mounted on an H-shaped plate 58, which is carried by the upper edges of the walls of a tank 59. The plate 58 has secured to its upper surfaces two parallel runners 59a which serve as guides for the sliding action of the plate 55. The apertured plate 55 is slotted at its right end to receive a journal 60 on which is mounted a drive bar 61. The drive bar 61 is slotted at 62 to provide a lost motion connection with a pin 63 carried by a crank 64.

Slidably mounted over plate 55 and over plate 58 is a U-shaped plate 65 having downwardly extending flanges 66 which abut at their lower edges on the plate 58. At the left end of U-shaped plate 65 is a slot 67 carrying a journal 68 on which is pivotally mounted a drive shaft 69 having a slot 70 on its other end 71. Within the slot 70, a pin 72 is carried for lost motion drive, the pin being driven by a crank 73. A cutting implement such as a wire 77 is stretched taut across the legs of the U-shaped plate 65 in such a position as to pass across the orifice 2 as the plate 65 is reciprocated.

Above the plate assembly are mounted two nozzles 74 and 75 for the delivery of a fluid against the material contained within the walls of apertures 56 and 57.

The operation of this embodiment of the invention is as follows. Cranks 64 and 73 are rotated at equal speeds but in opposite directions by any suitable means. With the plates in the position shown in Figure 13 and with the crank 64 rotating in a counterclockwise direction, the chamber formed by aperture 57 and the upper surface of the cross bar 76 in the plate 58 is filled with material during the first one-eighth of a revolution of the crank 64. During this time, the pin 63 is in slot 62 and does not impart any motion to plate 55. At the same time, the crank 73 begins in the position shown in Figure 13 and is moving in a clockwise direction through one-eighth of a revolution with the pin 72 sliding along slot 70 without imparting any motion to the plate 65 or to the wire 77. At the termination of the first one-eighth revolution of cranks 64 and 73, the pin 72 reaches the end of slot 70 and causes the wire 77 to move towards the orifice 2 and to traverse the orifice, thereby cutting the material in chamber 57. During this one-eighth of a revolution, during which the wire 77 moves, the pin 63 is still moving in the slot 62 without imparting motion to plate 55.

As the wire 77 emerges from the other side of orifice 2 at the termination of its cutting movement, pin 63 engages the end of slot 62 and through the following one-fourth revolution moves the plate 55 to the left, thereby exposing the material in chamber 57 to the spray of fluid from nozzle 75 whereupon the slice drops into the tank 59. Simultaneously, the chamber 56 comes to rest beneath the orifice 2. During this quarter revolution the wire 77 passes slightly beyond pipe 1 and then remains stationary as the pin 72 slides in the slot 70.

During the next one-eighth revolution, the pin 63 slides in slot 62 while the chamber 56 is filled and while the pin 72 slides in slot 70. At the termination of the filling, the pin 72 engages the other end of slot 70 and draws the plate 65 to the left, thereby causing the wire 77 to traverse the orifice 2 and to slice the material in the chamber 56. During the cutting operation, the pin 63 slides in slot 62 and, on the termination of said cutting, reaches the end of slot 62 to draw the plate 55 to the right during the next one-quarter revolution. During this feed time, the plate 65 is stationary as the pin 72 slides through slot 70. This cycle of operation is then repeated as first one and then the other chamber brings its contents under the action of the nozzles 74 and 75, which causes the material to drop into the tank 59. As with the previous embodiments of the invention, the nozzles 74 and 75 spray any suitable fluid and the tank 59 likewise contains any suitable liquid.

While all of the embodiments of this invention have been described in terms of one extrusion pipe it will be obvious that in practical high speed operations a large plurality of such extrusion pipes may be used. Thus the length of the knives or wire cutters may be increased so that one cutting means may serve several extrusion pipes or several cutting means may be utilized. In embodiments such as disclosed in Figures 9, 10 and 13 through 16, it will be clear to one skilled in the art that the feed plates may be increased in size to accommodate additional series of apertures which will feed material away from additional extrusion pipes.

Whereas this invention has been described in connection with specific apparatus this has been for illustrative purposes only and is not to be considered as limiting in any sense, the invention being limited only by the scope and spirit of the appended claims.

I claim:

1. A method of processing gel-like materials comprising the steps of, extruding said material through an orifice, passing a thin cutter through said material as it emanates from said orifice to sever portions of said material, physically urging said severed portions away from the material remaining in said orifice, and directing a flow of liquid against said severed portions to further aid in the separation of said severed portions.

2. A method of processing gel-like materials comprising the steps of, extruding said material through an orifice, passing a thin cutter through said material as it emanates from said orifice, said thin cutter moving substantially normal to the direction of movement of said material, passing a deflector blade through said material in the cut formed by the cutter and immediately following the passage of the cutter, and directing a flow of liquid against the severed portion of said material in such a direction as to force the severed material away from the orifice.

3. A method of processing gel-like materials comprising the steps of, extruding said material through an orifice and into a feeder, passing a thin cutter through said material between said orifice and said feeder, moving said feeder in a plane substantially normal to the direction of extrusion to laterally move the severed material away from said orifice and directing a flow of liquid against said severed material to aid in its removal from the feeder.

4. A method of processing gel-like materials comprising the steps of, extruding said material through an orifice, passing a thin cutter through said material as it emanates from said orifice to sever portions of said material, physically urging said severed portions away from the material remaining in said orifice and gelatinizing said severed portions.

5. A method of processing gel-like materials comprising the steps of, extruding said material through an orifice, passing a thin cutter through said material as it emanates from said orifice to sever portions of said material, physically urging said severed portions away from the material remaining in said orifice and directing a flow of gelatinizing agent against said severed portions.

6. In an apparatus for processing gel-like materials, the combination of: extrusion means having an orifice for extruding said gel-like material, a cutter mounted for repeated movement across said orifice for cutting said gel-like material into a series of slices as it is extruded from said orifice, movable means mounted for co-operation with said cutter to move the cut slices away from the material being extruded, and means for contacting said movable means and cut slices with a liquid to thereby facilitate removal of said slices from said movable means.

7. In an apparatus for processing gel-like materials the combination of: an extrusion pipe having an orifice for extruding said gel-like material, a cutter mounted for repeated movement across said orifice for cutting said gel-like material into a series of slices as it is extruded from said orifice, movable means mounted for co-operation with said cutter to move the cut slices away from the material being extruded, and a nozzle positioned to direct a stream of liquid against the cut slices in contact with said movable means to force said slices from said movable means.

8. In an apparatus for processing gel-like materials the combination of; an extrusion orifice for extruding gel-like material, a cutter wheel rotating on an axis substantially normal to the direction of movement of said gel-like material through said orifice, thin cutter means mounted around the periphery of said cutter wheel parallel to the axis of rotation of said cutter wheel, deflector means associated with said cutter means and mounted around the periphery of said cutter wheel to move the cut gel-like material away from the orifice, and nozzle means for directing a flow of liquid into the path of said cutter and deflector means across said orifice.

9. In an apparatus for processing gel-like materials the combination of; an extrusion pipe terminating in an extrusion orifice for extruding gel-like material, a cutter wheel rotating on an axis substantially normal to the axis of said pipe, thin elongated cutters mounted on said wheel parallel to its axis of rotation and equally spaced about its periphery, said axis of rotation being so spaced from said orifice as to cause said cutters to sequentially traverse said orifice substantially in contract therewith as said wheel rotates, a deflector blade mounted adjacent each cutter parallel thereto and having a leading edge and a trailing edge, said leading edge being spaced from said axis of rotation a distance equal to the spacing of the cutters therefrom, said trailing edge being spaced from said axis of rotation a slightly shorter distance, and a nozzle means for directing liquid between the gel-like material cut by said cutter and the gel-like material remaining in said pipe whereby said cut gel-like material is urged away from the gel-like material remaining in the pipe.

10. In an apparatus for processing gel-like materials the combination of; an extrusion pipe having an orifice, thin cutter means arranged radially about an axis of rotation parallel to the axis of said pipe and located so as to pass across said orifice on rotation about said axis of rotation, rotatable feed means for receiving gel-like material from said orifice and moving said material transverse to the axis of said pipe, said feed means comprising molds arranged radially about said axis of rotation of said cutter means so that each mold may be rotated to a position adjacent to said orifice and in line with the axis of said pipe, and means for rotating said feed means and said cutter means.

11. In an apparatus for processing gel-like materials the combination of; an extrusion pipe having an orifice, thin cutter means arranged radially about an axis of rotation parallel to the axis of said pipe and located so as to pass across said orifice on rotation about said axis of rotation, rotatable feed means for receiving gel-like material from said orifice and moving said material transverse to the axis of said pipe, said feed means comprising shallow cylinders arranged radially about said axis of rotation, each cylinder having an upper face and a lower face, the upper and lower faces lying in two parallel planes, said plane including said upper faces being substantially coplanar with said orifice whereby each cylinder may be rotated into a position adjacent said orifice to receive gel-like material, a plate parallel to and having an upper surface substantially coplanar with the plane including the lower faces of said cylinders, said cylinders and plate forming a mold for said gel-like material, and means to rotate said cylinders and said cutter means.

12. In an apparatus for processing gel-like materials the combination of, an extrusion pipe having an orifice, thin cutter means arranged to pass transversely across said orifice, movable feed means for receiving gel-like material and moving said material transverse to the axis of said pipe, said feed means comprising molds arranged in a line substantially normal to the axis of said pipe, said molds being driven along said line so that each mold occupies for a time a position adjacent said orifice, and means for driving said cutter means and said molds.

13. In an apparatus for processing gel-like materials the combination of; an extrusion pipe having an orifice, a plurality of elongated thin cutter means arranged in a spaced parallel relationship, means for simultaneously moving said cutter means normal to their elongated dimension across said orifice, movable feed means for receiving gel-like material and moving said material transverse to the axis of said pipe, said feed means comprising shallow cylinders arranged in a line substantially normal to the axis of said pipe, each cylinder having an upper face and a lower face, the upper and lower faces lying in two parallel planes, said plane including said upper faces being substantially coplanar with said orifice whereby each cylinder may be moved into a position adjacent said orifice to receive gel-like material, a plate parallel to and having an upper surface substantially coinciding with the plane including the lower faces of said cylinders, said cylinders and plate forming a mold for said gel-like material, and means to move said cylinders.

14. In an apparatus for processing gel-like materials the combination of; an extrusion pipe having an orifice, cutter means comprising at least one elongated thin cutter lying in a plane substantially normal to the axis of said pipe, means for oscillating said cutter means across said orifice, movable feed means for receiving gel-like material and moving said material transverse to the axis of said pipe, said feed means comprising shallow cylinders arranged in a line substantially normal to the axis of said pipe, each cylinder having an upper face and a lower face, the upper and lower faces lying in two parallel planes, said plane including said upper faces being substantially coplanar with said orifice whereby each cylinder may be moved into a position adjacent said orifice to receive gel-like material, a plate parallel to and having an upper surface substantially coinciding with the plane including the lower faces of said cylinders, said cylinders and plate forming a mold for said gel-like material, and means to reciprocate said cylinders back and forth across said orifice.

15. In an apparatus for processing gel-like materials the combination of; an extrusion pipe having an orifice, a cutter means comprising a plurality of thin elongated cutters parallelly arranged in a plane substantially normal to the axis of said pipe, deflector means comprising a plurality of thin elongated blades, one blade being associated with each cutter and having its longitudinal axis parallel to said cutter, the flat surfaces of said blades being mounted at an angle to the plane containing said cutters, means to simultaneously drive said cutters and blades across said orifice, feed means comprising a plurality of feed members arranged in a line in a plane substantially normal to the axis of said pipe, and means to move said feed members across said orifice to remove cut pieces of gel-like material.

16. The apparatus defined in claim 10 wherein at an angular position of rotation of said rotatable feed means said molds are open at both ends and wherein nozzle means are provided at such position for directing a flow of fluid against the surface of the material in said molds to thereby force said material from said molds.

17. The apparatus as defined in claim 12 in which said molds are movable to a position spaced from said orifice and at such position are open at both ends, and wherein nozzle means are provided at said position for directing a flow of fluid against the surface of the material in said molds to thereby force said material from said molds.

18. The apparatus as defined in claim 14 in which said feed means are movable to a position at which said cylinders clear said plate and wherein nozzle means are provided at such position for directing a flow of fluid against the surface of the material in said cylinders to thereby force said material from said cylinders.

19. The apparatus as defined in claim 15 in which said feed members are movable in an endless train past said orifice and past a station spaced therefrom, and wherein nozzle means are provided at said station for directing a flow of fluid against the surface of the material carried by said feed members to thereby force said material from said feed members.

References Cited in the file of this patent

UNITED STATES PATENTS

| | | |
|---|---|---|
| 558,987 | Ruger | Apr. 28, 1896 |
| 2,183,693 | Rasch | Dec. 19, 1939 |
| 2,403,547 | Peschardt | July 9, 1946 |
| 2,441,729 | Steiner | May 18, 1948 |
| 2,583,940 | Furlong | Jan. 29, 1952 |

FOREIGN PATENTS

| | | |
|---|---|---|
| 506,991 | Belgium | Nov. 30, 1951 |